May 27, 1969  G. D. SMITH  3,447,034
AUTOMOTIVE OVERDRIVE CONTROL
Filed Oct. 24, 1966

INVENTOR.
GERALD D. SMITH
BY Woodard, Weikart, Emhardt & Naughton
Attorneys

United States Patent Office 3,447,034
Patented May 27, 1969

3,447,034
AUTOMOTIVE OVERDRIVE CONTROL
Gerald D. Smith, Indianapolis, Ind., assignor to Versatek Industries, Inc., Lawrence, Ind., a corporation of Indiana
Filed Oct. 24, 1966, Ser. No. 589,032
Int. Cl. H02h 3/02, 7/00
U.S. Cl. 317—5            3 Claims

ABSTRACT OF THE DISCLOSURE

A non-chatter, snap-action switching circuit wherein the circuit's components are arranged in a housing which can be readily inserted into the speedometer cable train and the speedometer itself thus permitting control of the overdrive mechanism of an automobile transmission.

---

This invention relates generally to switching circuits or devices and in particular to such circuits or devices capable of providing a non-chatter, snap-action switching of a load circuit in response to a relatively small variation in the voltage of a signal input.

The device of the present invention finds particularly suitable application in the control of the electrical solenoid customarily used to shift an automobile transmission into and out of overdrive as the vehicle speed changes through a narrow speed range between, usually, 28 and 30 miles per hour. The use of overdrive in automobile transmissions is, of course, old and well known in the art. The required shift from direct drive to overdrive at 30 m.p.h. and return to direct drive at 28 m.p.h. has, in the past, been accomplished by a centrifugal-force operated device responsive, mechanically, to the vehicle speed. In addition to difficulties encountered in adjusting these prior art devices to compensate for various wheel or tire sizes, they suffered further from deterioration due to rust, corrosion caused by road salting in winter and exposure to temperature extremes.

The device of the present invention is installed at the speedometer terminus of the speedometer cable and accurately senses the change in speed of rotation of the cable as the vehicle moves through the critical overdrive shift and return speeds. The speed of rotation of a permanent magnet mechanically coupled to the conventional speedometer cable is sensed as a signal input to a transistor switching circuit whose output controls the overdrive shift solenoid. Adjustment of the response or switching speeds is conveniently made by varying the setting of a potentiometer in the input to the switching circuit. The device is located at a point within the vehicle which is protected from exposure and conveniently accessible.

The switching circuit is very sensitive to input signal voltage change and has a feedback characteristic which energizes and deenergizes the load circuit with non-chattering, snap-action of the load device. This characteristic of the switching circuit makes it useful for any application requiring small changes in alternating current RMS voltage to be sensed as an input signal. Such applications might be, for example, in burglar alarm devices, as a sensitive speedometer or in speed responsive automobile door lock devices, or, more generally, wherever switching action is required at a predetermined r.p.m.

It is an object of the present invention to provide a switching circuit providing a positive, snap-action DC switching function which is triggered by a relatively small variation in the RMS voltage of its AC input.

A further object of the present invention is to provide a device capable of providing a switching function by responding to changes in speedometer cable speed with the switch sensor interposed in the conventional speedometer cable linkage to the speedometer without requiring modification of or adversely affecting the operation of either the cable or the speedometer.

These and other objects will become apparent as the description proceeds with reference to the accompanying drawings in which.

Figure 1:
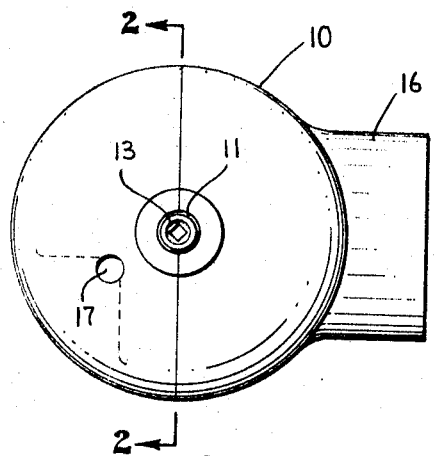
FIG. 1 is an end view of the structure of the present invention.
Figure 2:
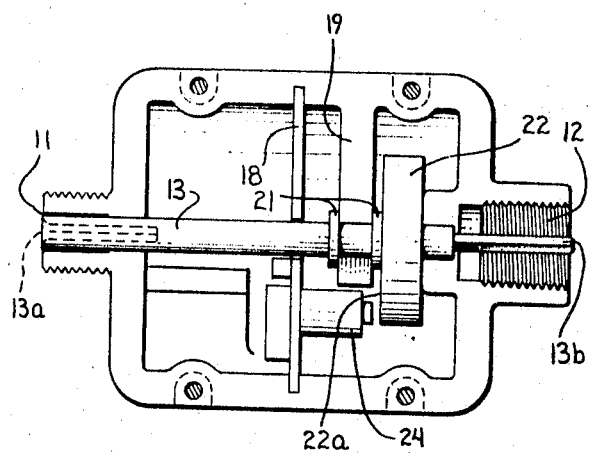
FIG. 2 is a side sectional view taken generally along the line 2—2 of FIG. 1.

Referring initially to FIGS. 1 and 2, the structure of the present invention is enclosed within a tubular housing 10 having central apertures 11 and 12 in its opposite ends, the housing adjacent the apertures providing a bearing surface for a shaft 13. The shaft extends through the housing and at one end 13a is provided with a counterbore adapted to receive the conventional speedometer cable tip, the speedometer cable input thus serving to rotate the shaft with the speedometer cable. At the opposite end 13b of the shaft 13, the shaft is of reduced diameter and the pin thus formed is adapted to be accommodated in the fitting of a conventional speedometer, the shaft 13 thus being interposed between the speedometer cable tip and the input fitting of a conventional speedometer.

As will be evident from FIG. 1 the housing has extending sidewardly therefrom a plug-in receptacle portion 16, the receptacle portion carrying various leads to the electrical components within the housing to be subsequently described. An aperture 17 in the end of the housing (FIG. 2) provides screwdriver access to the interior of the housing for adjustment of the potentiometer which is a component of the circuit of FIG. 3. Although ideally suited for installation at the speedometer head, the unit may be mounted at any convenient location within or near to the speedometer by utilizing adapter cable.

Figure 3:
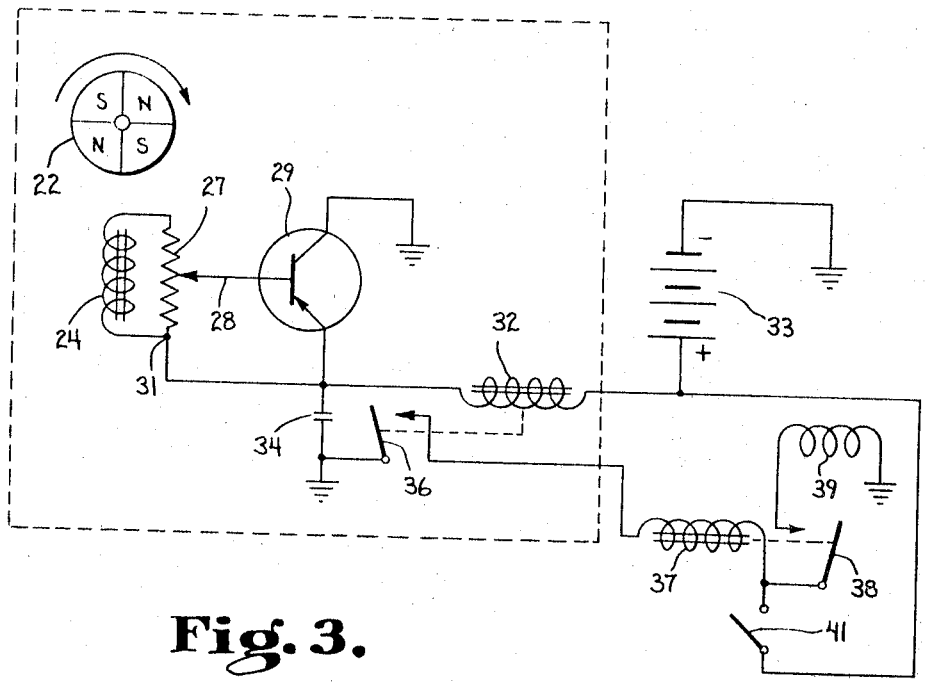
FIG. 3 is a schematic illustration of the circuit of the structure of the present invention.

As may best be seen in FIG. 2 the interior of the housing is divided by a printed circuit board 18 which carries the circuit wiring configuration and supports certain of the circuit components to be described subsequently with reference to FIG. 3. A portion of the housing indicated at 19 is provided with an aperture through which the shaft extends and provides a bearing support for the housing. Flanges 21, carried by the shaft 13, serve to retain the shaft axially in the housing and the adjacent faces of the flanges and the portion 19 provide thrust bearing surfaces. Supported on the shaft is a disc shaped permanent magnet 22 whose face 22a is magnetized with alternately opposite polarity, as indicated in FIG. 3. The magnet 22 is rigidly attached to the shaft 13 and is rotated thereby. Adjacent the magnetized face 22a of the magnet is a conventional inductive pickup coil 24, rotation of the magnet 22 thereby generating in the pickup coil an alternating voltage whose RMS value varies with the speed of rotation of the shaft 13.

Referring now to FIG. 3, the circuit components within the housing and their interconnection will now be described. Connected across the ends of the pickup coil 24 is a potentiometer 27, whose wiper arm 28 is connected to the base terminal B of a transistor 29, which may be of the PNP type. The lower end of the coil and the potentiometer junction 31 are connected to the emitter terminal E of the transistor 29. A relay coil 32 is also connected in the emitter circuit and the opposite end of the coil is connected to a DC power source 33, which may be the conventional twelve volt DC electrical system of the automobile in which the device is installed. The collector C of the transistor 29 is connected to the negative side of the power source through ground. An electrolytic capacitor 34 is connected between the emitter circuit and ground. The relay coil 32, when energized, closes a switch 36 which serves to connect across the power source 33 the power relay coil 37. Relay coil 37, when energized, closes switch 38 which places across the power source the overdrive solenoid 39 which functions to shift the transmission between direct drive and overdrive. It will be understood that the relay coil 37, switch 38, overdrive solenoid 39 and ignition switch 41 are all conventionally interconnected and are external to the circuit of the present invention which is shown enclosed in broken lines in FIG. 3.

In operation, with the device of the present invention physically interposed between the tip of the automobile speedometer cable and the input fitting of the speedometer, the rotation of shaft 13 will rotate magnet 22 and generate an AC signal voltage which, adjusted in magnitude by means of the positioning of the potentiometer arm 28, appears across the base-emitter terminals of the transistor 29. The potentiometer is adjusted so that at an automobile speed of 30 miles per hour the signal voltage is such as to cause current to flow between the emitter and collector terminals of the transistor and to energize the relay coil 32. Energization of relay coil 32 closes switch 36 which energizes power relay 37 and, consequently, the overdrive solenoid 39. The capacitor 34, connected between the emitter and ground functions to eliminate any AC pulse on the relay coil 32 and its capacity value sets the differential between the pull-in and drop-out values for the relay. The relay coil 32 has sufficient DC resistance to give good temperature stability. The feedback path provided by the connection between the pickup coil and potentiometer junction 31 and the transistor emitter provides a regenerative action resulting in a "snap action" in the emitter current and causing operation of the switch 36 to be positive and chatter-free.

While the circuit of the device of the present invention has been described as utilized in a speed responsive switch for controlling automotive overdrive, the circuit, and the inductive link between the speedometer cable and the circuit, could be utilized in an electronic governor to control engine speed, or this apparatus could be used, when modified slightly, to provide a cruise control device for automotive use (maintaining a generally constant automobile speed) or could be used as a dangerous speed warning device or an r.p.m. indicator for farm equipment. By providing a pulse counter and a visually indicating meter, the circuit might be utilized to provide an extremely accurate automotive speedometer.

The device of the present invention, as herein disclosed, utilizes components of the following values or magnitudes:

| | |
|---|---|
| Pickup coil 24 | ohms__ 1000 |
| Potentiometer 27 | ohms__ 500 |
| Transistor 29 | (PNP type)__ 2N3702 |
| Capacitor 34 | mfd. (16 volts)__ 100 |
| Relay 32 | ohms__ 1000 |
| DC power source 33 | volts DC__ 12 |

Having thus described the invention, what is desired to be claimed and secured by Letters Patent is:

1. A device responding to the speed of an automobile and adapted for interposition between the output end of the automobile speedometer cable and the speedometer input fitting comprising: a housing, a shaft extending through said housing and journaled for rotation therein, said shaft being formed at one end to accommodate the output end of the speedometer cable and at its other end to accommodate the speedometer input fitting, an element fixed to said shaft for rotation therewith and having a surface permanently magnetized with alternately opposite polarity, interconnected circuit components mounted within said housing including a pick-up coil disposed adjacent said magnetized element, and electrical connections extending through said housing including electrical power input and output terminals whereby said device may, when connected to electrical power input and output circuits, be utilized to provide an electrical indication of the speed of rotation of the speedometer shaft.

2. A device as claimed in claim 1 in which said interconnected circuit components include a printed circuit board on which said pick-up coil is mounted, said board further supporting an adjustable circuit calibrating resistor.

3. A device as claimed in claim 2 in which an aperture is provided in said housing to provide access to said calibrating resistor for adjustment thereof.

References Cited
UNITED STATES PATENTS

| | | | |
|---|---|---|---|
| 2,841,745 | 7/1958 | Shields | 317—5 |
| 2,950,420 | 8/1960 | Hastings et al. | 317—5 |
| 3,036,241 | 5/1962 | Zelina | 317—5 |
| 3,108,221 | 10/1963 | Peltola | 324—70 |
| 3,252,022 | 5/1966 | Smith | 310—95 |

JOHN F. COUCH, *Primary Examiner.*

G. GOLDBERG, *Assistant Examiner.*

U.S. Cl. X.R.

73—517; 317—19